United States Patent [19]

Takeda et al.

[11] 4,144,382

[45] Mar. 13, 1979

[54] ALKALINE CELL

[75] Inventors: Kazutoshi Takeda; Iwao Kishi, both of Tokyo, Japan

[73] Assignee: Kabushiki Kaisha Daini Seikosha, Japan

[21] Appl. No.: 752,089

[22] Filed: Dec. 20, 1976

[30] Foreign Application Priority Data

Dec. 19, 1975 [JP] Japan ............................... 50/151658

[51] Int. Cl.² .......................................... H01M 10/48
[52] U.S. Cl. ..................................... 429/91; 429/219; 429/230
[58] Field of Search ................. 429/91, 229, 230, 219, 429/218, 217

[56] References Cited

U.S. PATENT DOCUMENTS

| 2,942,052 | 6/1960 | Bourke et al. | 429/91 |
| 3,757,793 | 9/1973 | Fester et al. | 429/219 |
| 3,764,389 | 10/1973 | Hsia et al. | 429/230 |
| 3,961,985 | 6/1976 | Takamura et al. | 429/229 |
| 4,025,700 | 5/1977 | Fagan et al. | 429/91 |

OTHER PUBLICATIONS

Jasinski, High Energy Batteries, pub. Plenum Press, N.Y. 1967, pp. 58–60.

*Primary Examiner*—Donald L. Walton
*Attorney, Agent, or Firm*—Robert E. Burns; Emmanuel J. Lobato; Bruce L. Adams

[57] ABSTRACT

The active cathode material of an alkaline cell is a mixture of monovalent silver oxide and graphite or a compound of which the main ingredient is divalent silver oxide. The active anode material is powdered mercury-indium-zinc alloy mixed with a suitable binder and pressed into formed or gelled state. After almost all of the zinc of the anode material is exhausted during the course of discharge of the cell, a small quantity of indium acts as the anode active material so as to continue to supply current for a period of time but at lower voltage. By detecting the voltage drop, it can be determined that the cell is approaching the end of its useful life.

6 Claims, 2 Drawing Figures

ALKALINE CELL

FIELD OF INVENTION

The present invention relates to alkaline cells and particularly, to means for detecting that an alkaline cell is nearing the end of its useful life.

BACKGROUND OF INVENTION

Generally the discharge voltage of an alkaline cell such as a nickle-zinc cell, an alkali maganese cell, a silver oxide cell or a silver peroxide cell remains substantially constant from the beginning of discharge until almost the end of the life of a cell when the active material is completely used up. It is hence extremely difficult to provide any advance warning that a cell is approaching the end of its useful life. As a result it is difficult to know when the cell should be replaced. In case a conventional alkaline cell is used in an extremely important device, such as an artifical pacemaker for the heart which keeps a patient alive, the cell is changed after a predetermined constant time from the point of view of safety even though the cell is still able to continue to work. It would be desirable to continue using the cell for a longer period of time but this cannot be done for safety reasons.

SUMMARY OF INVENTION

It is an object of the present invention to provide an improved alkaline cell which avoids the aforementioned drawbacks. In accordance with the invention a small quantity of a secondary active material is included with the primary active material of the cell. After substantially all of the primary active material has been used up, the secondary active material continues to provide current for a period of time but at a somewhat lower voltage. By detecting the voltage drop it can be determined that the cell is approaching the end of its useful life.

BRIEF DESCRIPTION OF DRAWINGS

The nature, objects and advantages of the invention will be more fully understood from the following description of a preferred embodiment shown by way of example in the accompanying drawings in which.

DESCRIPTION OF PREFERRED EMBODIMENT

Figure 1:
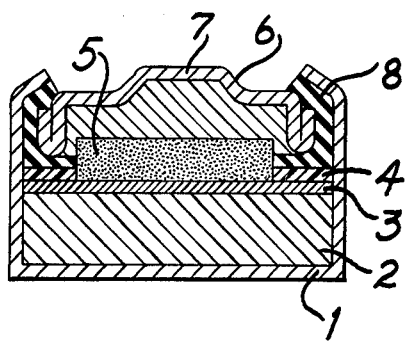
FIG. 1 is a schematic cross sectional view of a cell in accordance with the invention and FIG. 2 shows curves illustrating the discharge characteristics of a conventional silver oxide cell and a cell according to the invention.

The invention will be described with reference to a preferred embodiment which is shown by way of example in FIG. 1. The cell shown in FIG. 1 is a silver oxide cell of JIS GS-12 TYPE (DIAMETER 11.6 mm, HEIGHT 4.2mm). A cathode container 1 serves as the cathode terminal of the cell. Active cathode material 2, a barrier 3, a plastic ring 4 and an electrolyte absorbent means 5 are contained in the cathode container 1. In the illustrated embodiment the cathode active material 2 is a mixture of monovalent silver oxide ($Ag_2O$) and graphite or a compound of which the main ingredient is divalent silver oxide.

An anode container 7 serves as the anode terminal of the cell and contains anode active material 6. The anode active material 6 is made from powdered mercury-indium-zinc alloy which is uniformly mixed with a suitable binder and compressed into a formed state or a gelled state. An insulating gasket 8 is located between the cathode terminal 1 and the anode terminal 7.

The anode active material 6 of the illustrated embodiment according to this invention is made as follows:

10g of indium metal particles are added to 23.3g of mercury and the mixture is shaken so as to form at room temperature a fluid indium-mercury alloy. 210g of powdered zinc of 60–120 mesh is then added to such fluid indium-mercury alloy. After that the mixture of fluid indium-mercury alloy and powdered zinc is shaken for about 4 hours to amalgamate the powdered zinc with the fluid indium-mercury alloy and is heated about 60 minutes at about 60° C. in order to form a powder of mercury-indium-zinc alloy. Such powder of mercury-indium-zinc alloy is mixed uniformly with a suitable binder, for example, carboxymethyl-cellulose, sodium polyacrylic acid, polyethyleneglycol or polyvinyl alcohol and the resulting mixture of powdered mercury-indium-zinc alloy and binder and is then compressed into formed or gelled state. The anode active material 6 and other components of the cell as illustrated in FIG. 1 are then assembled and the upper edge portion of the cathode container 1 is crimped over to seal the cell.

A cell having such anode active material was subjected to a 7.5KΩ continuous discharge test. As shown by curve A in FIG. 2 the cell began to discharge at 1.56 volts from the beginning of the test as indicated at a and the voltage remained substantially constant until almost the end of discharge as indicated at b. When almost all of the primary negative active material of zinc was used up, the discharge voltage dropped from 1.56 volts to 1.34 volts which is the inherent voltage of an In-$Ag_2O$ cell as indicated by the curve portion b – c but the cell continued to produce current for a period of time at the lower voltage as indicated by the curve portion c – d. By detecting the voltage drop b – c it can be readily determined that the cell is approaching the end of its useful life but is still usable for a predetermined period of time. This provides advance warning that the cell should be replaced.

Figure 2:
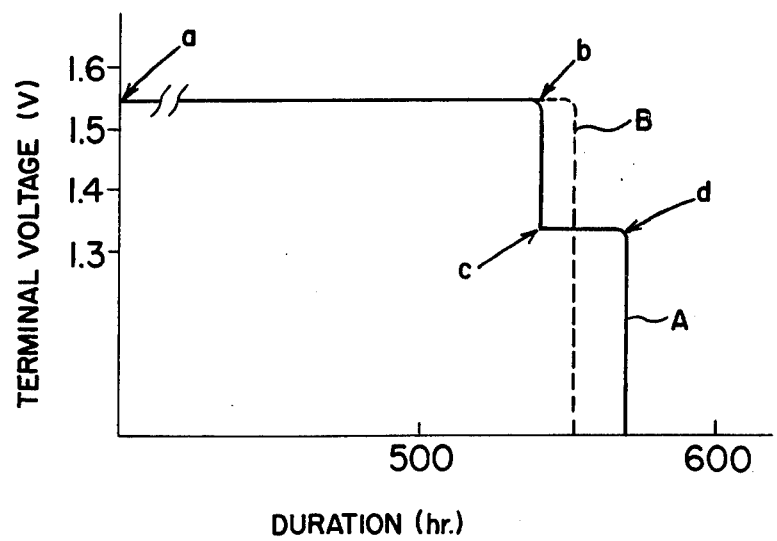

Curve B in FIG. 2 illustrates the 6.5K continuous discharge characteristics of a conventional silver oxide cell. From curve B it will be seen that the discharge voltage of a conventional silver oxide cell remains substantially constant until the active material is used up whereupon the voltage drops substantially to zero. Hence no warning is provided that the cell is nearing the end of its useful life.

In curve A of FIG. 2 which represents the continuous discharge characteristics of a cell in accordance with the invention as shown in FIG. 1, the region between a and b denotes the discharge voltage of zinc-silver oxide ($Ag_2O$) that is a constant voltage of 1.56 volts. The region between c and d denotes the discharge voltage of indium-silver oxide, that is a constant voltage of 1.34 volts. The duration of the period during which current is supplied at the reduced voltage, i.e., the region between c and d, is freely selected by changing the additive amount of metal indium. It can thus be predetermined how long the cell will continue to operate after the reduction of voltage as represented by the b – c portion of curve A in FIG. 2.

The drop in the discharge voltage of the cell as represented by the b – c portion of curve A can be readily detected, for example by a simple voltage detecting circuit so as to provide a clear and unmistakeable indication that the cell is approaching the end of its useful life. The user of the cell then has a predetermined period as represented by the portion c – d of curve A in which to replace the almost depleted cell with a fresh cell. The cell in accordance with the invention is suitable for various electronic devices such as an electronic watch which requires high reliability.

While the invention has been explained with reference to a silver oxide cell as illustrated by way of example in the drawings, it is needless to say that this principle can be applied to other alkaline cells, for example, nickle-zinc cells, air zinc cells, alkali maganese cells or zinc-mercury oxide cells which use zinc as an anode active material. It will hence be recognized that the invention is no way limited to the preferred embodiment of the invention illustrated in FIG. 1 and described above.

What we claim is:

1. A silver oxide alkaline battery cell comprising a cathode active material consisting essentially of a mixture of monovalent silver oxide and graphite or a compound of which the main ingredient is divalent silver oxide, an alkaline electrolyte and an anode active material consisting essentially of powdered mercury-indium-zinc alloy uniformly mixed with a binder and pressed into formed or gelled state, said cell having a first substantially constant predetermined discharge voltage until the zinc of said anode active material is substantially used up and thereafter having a second substantially constant predetermined discharge voltage which is lower than said first voltage, for a predetermined period of time, whereby the drop in voltage from said first voltage to said second voltage provides an advance indication that the cell is nearing the end of its useful life.

2. A cell according to claim 1, in which the proportion of indium to zinc in said anode active material is of the order of 5%.

3. A cell according to claim 1 in which said binder is selected from the group consisting of carboxymethylcellulose, sodium polyacrylic acid, polyethyleneglycol and polyvinyl alcohol.

4. A button-type battery cell for an electric watch comprising a cup-shaped cathode container serving as the cathode terminal of said cell; cathode active material, a barrier and alkali electrolyte absorbent means contained in said cathode container, said cathode active material consisting essentially of a mixture of monovalent oxide and graphite or a compound of which the main ingredient is divalent silver oxide; an anode container serving as the anode terminal of said cell, anode active material contained in said anode container, said anode active material consisting essentially of powdered mercury-indium-zinc alloy uniformly mixed with a binder and pressed into formed or gelled state in said anode container, and insulating gasket means sealing said cathode container and anode container together, said cell having a first substantially constant predetermined discharge voltage until the zinc of said anode active material is substantially used up and thereafter having a second substantially constant predetermined discharge voltage which is lower than said first voltage, for a predetermined period of time, whereby the drop in voltage from said first voltage to said second voltage provides an advance indication that the cell is nearing the end of its useful life.

5. A cell according to claim 4, in which the proportion of indium to zinc in said anode active material in order of 5%.

6. A cell according to claim 4, in which said binder is selected from the group consisting of carboxymethylcellulose, sodium polyacrylic acid, polyethyleneglycol and polyvinyl alcohol.

* * * * *